April 27, 1926.
B. H. SMITH
1,582,699
ELECTRICAL MEASURING INSTRUMENT
Filed Feb. 19, 1921
2 Sheets-Sheet 1
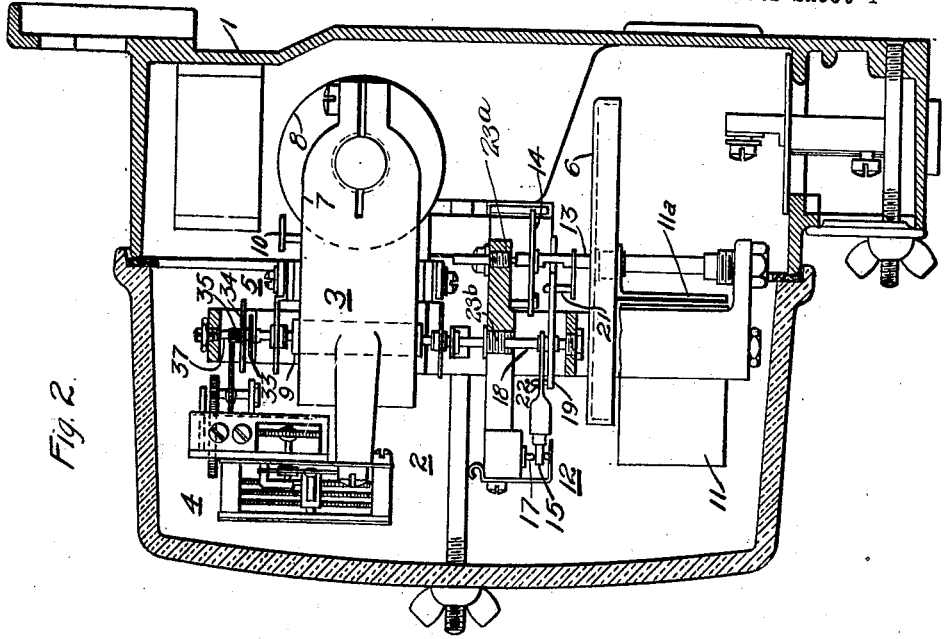
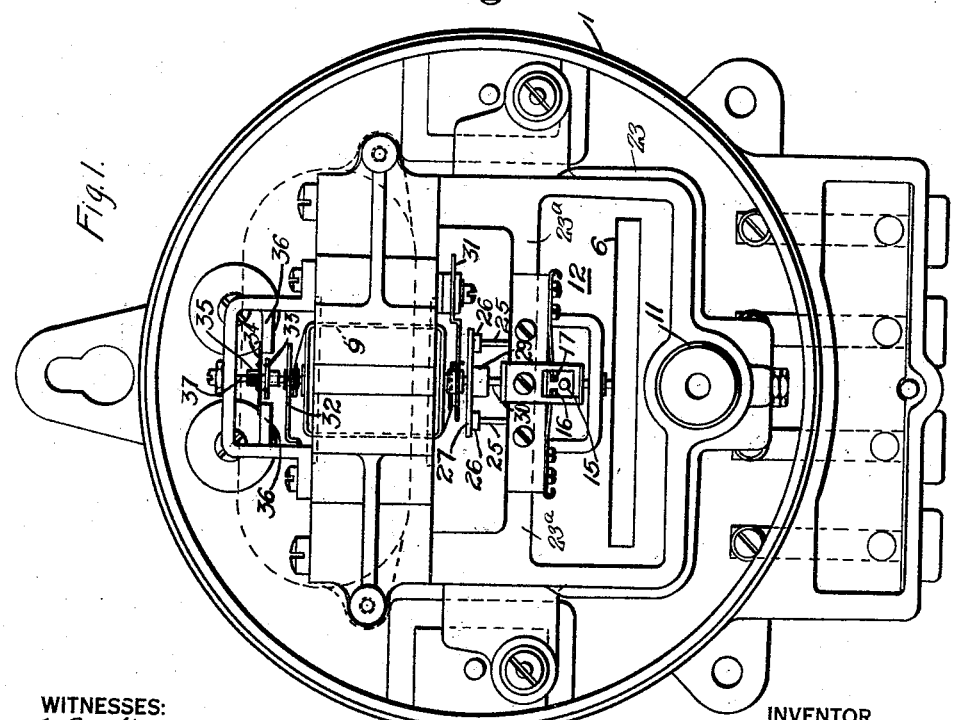
WITNESSES:
INVENTOR
Benjamin H. Smith
BY
ATTORNEY

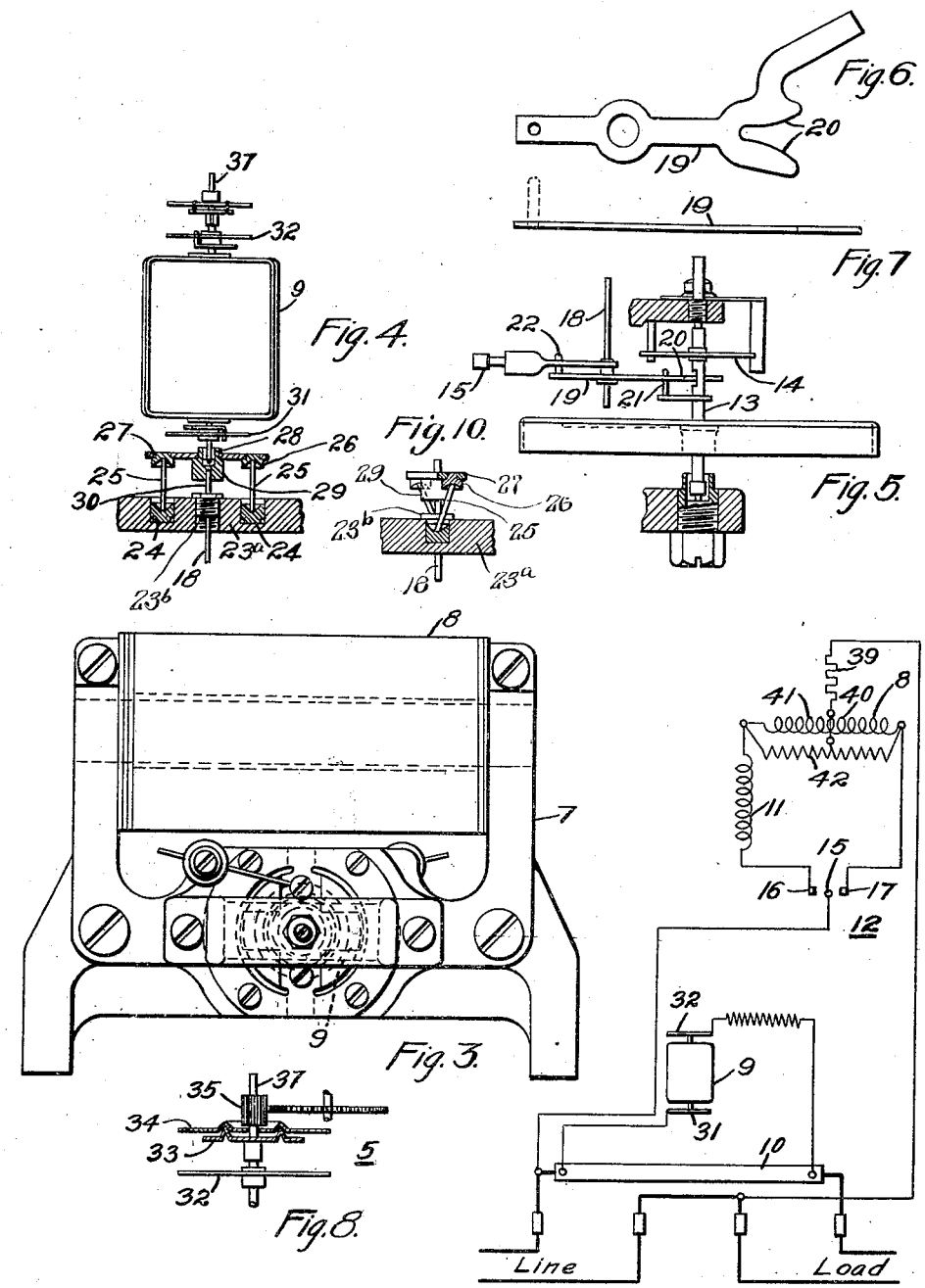

Patented Apr. 27, 1926.

1,582,699

UNITED STATES PATENT OFFICE.

BENJAMIN H. SMITH, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed February 19, 1921. Serial No. 446,301.

To all whom it may concern:

Be it known that I, BENJAMIN H. SMITH, a citizen of the United States, and a resident of Wilkinsburg, in the county of Allegheny and State of Pennsylvania, have invented a new and useful Improvement in Electrical Measuring Instruments, of which the following is a specification.

My invention relates to electrical measuring instruments and particularly to direct-current watthour meters of the oscillating type.

One object of my invention is to provide a direct-current watthour meter that shall have means whereby the current winding may be supplied with current through a current shunt.

Another object of my invention is to provide a direct-current watthour meter that shall have magnetic material in the field circuit of its windings.

Another object of my invention is to provide a meter, of the above indicated character, in which the excitation of the magnetizing coil of the magnetic circuit may be periodically reversed in order to obtain a deflection by the movable current coil on either side of its de-energized position that shall be proportional to the power traversing the circuit that is to be metered.

Another object of my invention is to provide a new method of disposing a discharge resistor for an inductive winding which consists in simultaneously winding the resistor on the core or bobbin with the inductive winding.

A further object of my invention is to provide a meter, of the above indicated character, that shall be small and rugged in structure, simple and inexpensive to construct, and effective and reliable in its operation.

United States Patent No. 1,355,515, issued to me Oct. 12, 1920, and assigned to the Westinghouse Electric & Manufacturing Company, discloses a direct-current watthour meter of the oscillating type which comprises an indicating instrument, an integrating mechanism, a clutch for periodically connecting the integrating device to the instrument and an oscillating device actuated by the clutch-controlling device for periodically rendering the indicating instrument inoperative.

In practicing my present invention, I also provide an indicating instrument, an integrating mechanism, a clutch for periodically connecting the instrument to the integrating mechanism, and an oscillating device for periodically rendering the clutch operative. Since the amplitude of movement of the indicating instrument is proportional to the power traversing the instrument and since the instrument is connected to the integrating mechanism for uniform intervals of time, the mechanism is actuated in accordance with the energy to be measured.

The indicating instrument comprises a magnet that is energized by a voltage coil and is further provided with a movable current coil that is disposed in the magnetic circuit of the magnet. The current coil is energized from a shunt in the circuit, the energy traversing which is to be measured. The advantages of my present invention over that disclosed in the above-mentioned patent reside in the periodic reversal of the excitation of the voltage coil to periodically reverse the direction of movement of the movable current coil. The operation thus obtained corresponds to the continuous operation of the integrating mechanism by the indicating instrument.

The use of an instrument having such a magnetic circuit permits the operating coils to be relatively small, and, consequently, the instrument may be operated from a current shunt. The disadvantages of the motor-type meter heretofore used are avoided, since the commutator friction is eliminated and the necessity for torque devices and damping magnets required with those meters is obviated in the meter embodying my invention which, although accurately registering on light loads, has no tendency to creep.

Figure 1 of the accompanying drawings is a front elevational view of a measuring instrument embodying my invention;

Fig. 2 is a side view, partially in elevation and partially in section, of the instrument shown in Fig. 1;

Fig. 3 is a top plan view of the instrument shown in Figs. 1 and 2;

Fig. 4 is a front view, partially in elevation and partially in section, of a movable current coil and the elevating element therefor;

Fig. 5 is a side view, partially in elevation and partially in section, of the reversing switch and the operating mechanism therefor;

Figs. 6 and 7, are respectively, plan and side views of the operating fork for the reversing switch shown in Fig. 5;

Fig. 8 is a side elevational view of the clutch for operating the integrating mechanism;

Fig. 9 is a diagram, illustrating the connection of the various windings embodied in the instrument shown in Fig. 1; and Fig. 10 is a detail view of the bottom portion of the structure shown in Fig. 4, taken at right angles thereto.

The instrument comprises, in general, a supporting base plate 1, an indicating instrument 2 supported thereon and a cover for protecting the instrument from contact with external objects and for precluding the admission of dust and other particles thereto.

The instrument 2 comprises, in general, an indicating device 3, an integrating mechanism 4, a clutch 5 for connecting the instrument to the integrating mechanism 4, and an oscillating member 6 for periodically controlling the connection and disconnection of the indicating device 3 and the integrating mechanism 4.

The indicating instrument 2 is provided with a magnetizable core member 7, a voltage coil 8 for energizing that member, and a movable current coil 9 that is energized from a current shunt 10 and that is adapted to move through an angle proportional to the power traversing the instrument.

The oscillating member 6 is maintained in operation by a coil 11 that is periodically energized. The circuit of the coil 8 is controlled by a switch 12 which, in turn, is controlled by the oscillating member 6. The switch 12 also controls the circuit of the voltage coil 8 to cause that coil to be excited in a normal or in a reversed sense, in order to control the movement of the movable current coil 9 in either a forward or a backward direction.

The oscillating member 6 is mounted on a shaft 13 upon which is also mounted a spring 14 that serves to return the oscillating member 6 to its initial position after the coil 11, that controls the oscillating member, is de-energized by the switch 12. The coil 11 turns the shaft 13 by periodically attracting the arm 11ª that is fixedly secured to the shaft.

The switch 12 comprises a movable contact member 15 and two stationary contact members 16 and 17 that are adapted to be alternatively engaged thereby. The movable memebr 15 is pivotally mounted, at one end thereof, on a shaft 18 and is adapted to engage the contact members 16 and 17 with the other end thereof.

The movement of the contact member 15 is controlled by a forked member 19 that is also pivotally mounted, at a point intermediate its ends, on the shaft 18. The forked member 19 has two arms 20 disposed at one end thereof that are adapted to be engaged by a cam member 21 which is mounted on the shaft 13. The other end of the forked member 19 is provided with a pin 22 that extends laterally through a relatively large opening in the movable member 15 to actuate the latter in accordance with the actuation of the arms 20 of the forked member 19 by the cam member 21. When the forked member 19 is actuated by the cam member 21, the shaft 18 is turned thereby.

A mid-portion 23ª of the supporting frame member 23 of the instrument 2, supports a bushing 23ᵇ through which the shaft 18 extends. Two bearings 24 are disposed in the portion 23ª, and two pin members 25 co-operate with the bearings 24 and two cup bearings 26 to support the movable coil 9. The bearings 26 are disposed on a supporting member 27 that is provided with a bearing 28 for the movable coil 9 and a hub 29 for the reception of the upper end of the shaft 18.

Two helical springs 31 and 32 serve the double function of providing terminals, whereby the movable coil 9 may be connected to the external circuit and whereby adjustments may be made in the torque required to actuate the coil.

The clutch 5 comprises a disc member 33, the movement of which is controlled by the movable coil 9, and a disc member 34 that is secured to a pinion 35 by which the integrating mechanism is actuated. The disc 34 normally rests upon two seat portions 36 from which it is raised and turned to actuate the mechanism, when engaged by the disc member 33.

The top surface of the disc 33 is provided with a circular ridge of inverted V-shape concentric with the axis of the shaft 37 to which the disc is secured. The lower surface of the disc 34 is provided with a circular depression of corresponding shape which is engaged by the elevation on the lower disc 33 during periodic intervals. The co-operation of the elevated ridge of the lower disc with the depression in the upper disc serves to center the upper disc 34 when it is engaged and disengaged by the lower disc 33, since the pinion 35 and the disc 34 are free from the shaft 37.

When the shaft 18 is turned by the action of the oscillating member 6, the consequent turning of the lower bearings 24 from positions directly underneath the upper bearings 26 permits the supporting member 27 and, consequently, the coil 9 to be lowered. Under this condition, the disc members 33 and 34 of the clutch become disengaged.

When the shaft 18 turns to return the lower bearings 24 to positions directly underneath the upper bearings 26, however, the supporting member 27 and the coil 9 are elevated and the disc 33 caused to engage the disc 34. Rotation of the current coil 9, while in this position, actuates the integrating mechanism 4.

When power traverses the circuit, the current coil is deflected in a backward direction an angular distance proportional to the power traversing the circuit. The oscillating member 6 then turns the shaft 18, by means of the fork member 19, to bring the pins 25 in a vertical position to thereby elevate the coil 9 and to cause the disc members 33 and 34 of the clutch 5 to engage.

Further movement of the fork member 19 actuates the switch 12 to reverse the excitation of the voltage coil 8, whereupon the current coil is turned in a forward direction an angular distance beyond its neutral position, that is proportional to the power traversing the instrument at that moment. Since the disc members of the clutch are in engagement, the integrating mechanism is correspondingly actuated.

Upon the completion of the interval during which the current coil 9 turns in a forward direction to actuate the integrating mechanism, the shaft 18 is turned back to its initial position, whereupon the pins 25 are displaced from their vertical position to permit the movable coil 9 to be lowered.

Immediately after the lowering of the movable coil 9, the movement of the fork member 19 actuates the switch to its initial position to reverse the excitation of the voltage coil 8, whereby the movable coil 9 is caused to move in a backward direction an angular distance beyond its neutral position, that is proportional to the power traversing the instrument during that interval. The coil is then again raised to actuate the integrating mechanism and the above sequence of operation is repeated.

It will thus be observed that the instrument actuates the integrating mechanism in accordance with the sum of the average values of power traversing the instrument during predetermined periodic intervals of time. Thus, before the connection of the movable coil to the integrating mechanism, it moves backward an angular distance proportional to the power traversing the instrument and, when connected to the instrument, it moves forward an angular distance beyond its neutral position proportional to the power traversing the instrument. The effect obtained, therefore, is the same as though the instrument were permanently connected to the integrating mechanism and continuously operating the same.

The current shunt 10 is disposed adjacent the movable current coil 9 to be subjected to the same ambient temperature in order to directly compensate for any changes in that temperature.

A non-inductively wound resistor 39 is connected between a point intermediate the ends of the voltage coil 8 and one line conductor. The two portions 40 and 41 of the coil 8 are so proportioned that the resistance of one portion 40 is equal to the sum of the resistances of the other portion 41 and of the operating coil 11.

A discharge resistor 42 is connected between the terminals of the winding 8 and, in the disposition thereof, is wound simultaneously with the winding 8. This method of disposing the discharge resistor is simple, economical and convenient.

By the use of an iron magnetic circuit, relatively small coils may be employed and the inherent disadvantages of the motor-type meter are avoided in the elimination of friction, friction-torque devices and damping magnets.

My invention is not limited to the specific structure that is illustrated, since modifications may be made therein within the spirit and scope of the invention, as set forth in the appended claims.

I claim as my invention:—

1. A watthour meter comprising an oscillating member, means for controlling the oscillating member, an integrating mechanism, a D'Arsonval meter element comprising a magnetizable member, energizing means therefor and a movable coil controlled by the oscillating member to be operatively connected to the integrating mechanism and means for causing direct current to alternately traverse different portions of the energizing means in opposite directions.

2. An electrical measuring instrument comprising a magnetizable member, a continuously-energized coil affected thereby and a second coil having two portions each intermittently traversed by current in one direction only for energizing the magnetizable member, the current traversing each of said portions in opposite direction to the current in the other.

3. In a watthour meter, the combination with an oscillating member, an integrating mechanism and a meter element comprising a stationary voltage coil and a movable current coil, of means controlled by the oscillating member for consecutively effecting the operative connection of the movable coil to the integrating mechanism, the energization of the voltage coil in one direction to actuate the current coil and the integrating device, the release of the movable coil from the integrating mechanism, and the reversal of the energization of the voltage coil to actuate the movable coil in the opposite direction.

4. In a watthour meter, the combination with an oscillating member, an integrating mechanism and a meter element comprising a stationary voltage coil and a movable current coil, of means for controlling the connection and the disconnection of the movable coil from the integrating mechanism, and a switch controlled by the oscillating member for periodically reversing the energization of the voltage coil to move the movable coil in a forward direction while that coil is operatively connected to the integrating mechanism and to move that coil in a backward direction while disengaged prior to the subsequent re-engagement with the integrating mechanism.

5. An electrical measuring instrument comprising a magnetizable member, a continuously-energized movable current coil affected thereby, a divided energizing voltage coil and means for causing each division of the voltage coil to be intermittently traversed by current in one direction only alternately with, and in opposite direction to, the current in the other division.

6. A meter comprising integrating means, an oscillating element resiliently biased toward an intermediate zero position and actuated in both directions therefrom in accordance with the product of two quantities of a circuit to be measured and means for transmitting movement of the oscillating element in one direction only thereof to said indicating means to integrate values of said product.

7. In a watthour meter, the combination with an oscillating member, an integrating mechanism and a meter element comprising a stationary voltage coil and a movable current coil, of means controlled by the oscillating member for controlling the periodic connection and disconnection of the movable coil and the integrating mechanism, and means for periodically reversing the excitation of the voltage coil to cause the movable coil to turn in opposite directions according to whether the said coil is connected to, or disconnected from, the integrating mechanism.

8. In a watthour meter for an electric circuit, the combination with an integrating mechanism and a wattmeter element comprising a magnetizable member, an energizing coil therefor energized in accordance with the voltage of the circuit and a movable coil energized from a meter shunt in the circuit, of means for periodically operatively connecting and disconnecting the movable coil and the integrating mechanism and means including contact members which are electrically independent of the movable coil for reversing the excitation of the voltage coil during the respective periods of connection and disconnection of the movable coil to move the coil in opposite directions.

9. A meter comprising integrating means, an oscillating element biased toward one position for actuating the same and means for connecting and disconnecting the element and the integrating means, said element being movable in one direction from said position in proportion to a value of a quantity to be measured while disconnected from the integrating means and in the other direction in proportion to a value of the quantity while connected to the integrating means.

10. An electrical measuring instrument comprising indicating means, an oscillating quantity-responsive actuating element therefor, and means for periodically connecting said element to said means including a clutch member connected to said indicating means, a co-operating clutch member connected to said element, a second oscillating element axially aligned with the first element, and means including a plurality of pins disposed between, and extending in the general direction of the axes of, said elements which are movable angularly relative to said axes to move the first element and its attached clutch member longitudinally to and from operative relation to said first clutch member in accordance with the direction of movement of the second oscillating element.

In testimony whereof, I have hereunto subscribed my name this 15th day of February, 1921.

BENJAMIN H. SMITH.